United States Patent

Katayev

[11] Patent Number: 5,208,896
[45] Date of Patent: May 4, 1993

[54] ELECTRICALLY WARMED BABY BOTTLE WITH RECHARGEABLE BATTERY RECHARGING SYSTEM

[76] Inventor: Alexander Katayev, 89-15 102nd St., Apt. 2C, Richmond Hill, N.Y. 11418

[21] Appl. No.: 576,611

[22] Filed: Aug. 31, 1990

[51] Int. Cl.$^5$ .......................... F27D 11/02; H05B 1/02
[52] U.S. Cl. ................................ 392/444; 219/432; 219/435; 219/521; 320/2
[58] Field of Search ............... 392/444, 445, 448, 502, 392/443; 219/432–442, 523, 521; 320/2

[56] References Cited

U.S. PATENT DOCUMENTS

| | | | |
|---|---|---|---|
| 2,541,218 | 2/1947 | Doerr | 219/436 |
| 2,640,907 | 6/1953 | Morey | 219/433 |
| 2,680,190 | 6/1954 | Schmidt | 219/432 |
| 3,079,486 | 2/1963 | Winchell | 219/528 |
| 3,247,360 | 4/1966 | Ponder | 392/444 |
| 3,432,641 | 3/1969 | Welke | 219/433 |
| 3,513,290 | 5/1970 | Burley et al. | 219/242 |
| 3,931,494 | 1/1976 | Fisher et al. | 219/521 |
| 3,978,233 | 8/1976 | Bolt | 219/432 |
| 4,095,090 | 6/1978 | Pianezza | 320/2 |
| 4,801,782 | 1/1989 | Ineson | 219/518 |

Primary Examiner—Bruce A. Reynolds
Assistant Examiner—John A. Jeffery
Attorney, Agent, or Firm—Lieberman Rudolph & Nowak

[57] ABSTRACT

An electrically warmed baby bottle and recharging system are provided. The baby bottle is a container made of an electrically non-conductive material with a heating wire embedded in its walls. Mounted below the container is a temperature regulation system including a thermostat, a rechargeable battery and an on-off switch enclosed within a water-tight housing. The electrically warmed baby bottle fits into a battery charger which is designed with plug prongs which enter the water-tight housing through self-sealing ports so as to recharge the battery.

9 Claims, 7 Drawing Sheets

ELECTRICALLY WARMED BABY BOTTLE WITH RECHARGEABLE BATTERY RECHARGING SYSTEM

BACKGROUND OF THE INVENTION

The subject invention provides an electrically warmed baby bottle which represents an improvement over baby bottle warmers and baby bottles known in the past and provides a solution to the long felt need for a portable heated baby bottle. Baby bottle warmers are well known in the prior art. However, no warmer known to date provides a portable system which can be reheated without need for a cumbersome external heating unit.

U.S. Pat. No. 2,541,218, issued Feb. 14, 1947, to Doerr, describes a bottle heater capable of being powered by the cigar lighter in an automobile. To heat the bottle, the bottle is placed within a heated can which radiantly transfers heat to the bottle.

U.S. Pat. No. 3,432,641, issued Mar. 11, 1969, to Welke, discloses a portable baby bottle heating device. Welke uses a three component system which includes a power supply unit which contains a rechargeable battery, a heat supply unit, and a container (baby bottle). The heat supply is separate from the bottle and heats the bottle by radiant heat. The bottle must be removed from the heat supply unit prior to use.

U.S. Pat. No. 3,931,494, issued Jan. 6, 1976, to Fisher and Spector, teaches a vessel incorporating a battery, heating coil, thermostat, and on-off switch. Fisher and Spector require that the bottom compartment containing the battery, thermostat and on-off switch have a screw-type closing mechanism to access the pivotable plug prongs corrected to the battery. The subject invention, in contrast, provides means for recharging a battery which does not require disassembling the water-tight housing. Accordingly, the subject invention provides a convenience not contemplated by Fisher and Spector.

Unlike the baby bottle warmers described before, the heating elements of the subject invention are molded within the walls of the bottle thereby allowing more even heat dispersion. Additionally, the electrically warmed baby bottle of the subject invention provides a bottle which maintains the temperature of a liquid or baby food during use.

SUMMARY OF THE INVENTION

An electrically warmed baby bottle and recharging system is provided. The electrically warmed baby bottle is composed of a container made of an electrically non-conductive material, an electrically conductive heating wire embedded in the wall of the container, and a temperature regulation system mounted below the container in a water-tight housing having self-sealing ports. The temperature regulation system includes a thermostat which extends through the housing into the interior of the container, a rechargeable battery connected to the conductive heating wire via the thermostat, and an on-off switch. The thermostat is able to regulate the flow of electricity to the conductive heating wire so as to maintain the interior of the container at a predetermined temperature. The rechargeable battery is mounted in such a manner so as to allow plug prongs of a battery charger to transverse the water-tight housing through the self-sealing ports for recharging the battery. And, on-off switch is mounted within the water-tight housing and is accessible from the exterior of the water-tight housing by indenting a flexible section of the housing.

The electrically warmed baby bottle is recharged by placing it in a battery charger constructed in such a manner so as to conform to the shape of the water-tight housing. The battery charger has plug prongs which align with the self-sealing ports of the baby bottle so that when the baby bottle is placed in the battery charger, the prong plugs of the battery charger enter the self-sealing ports and create an electrical contact with the rechargeable battery.

DETAILED DESCRIPTION OF THE INVENTION

The subject invention provides an electrically warmed baby bottle capable of maintaining its contents at a predetermined temperature. Typically, the predetermined temperature is about the temperature of mother's milk. However, lower or higher temperatures may be maintained. The subject invention includes a container made of electrically non-conductive material, an electrically conductive heating wire embedded in the wall of the container, and a temperature regulation system having a thermostat, a rechargeable battery and an on-off switch contained within a water-tight housing mounted below the container. The water-tight housing is equipped with self-sealing ports which prevent the entrance of water into the housing during washing, but allow the plug prongs of a battery charger to enter the housing to recharge the battery.

The subject invention will now be described in terms of a preferred embodiment as depicted in FIGS. 1-5. However, this description is not intended to limit the scope of the claims and their equivalents which are to be viewed as reflecting the scope and spirit of the subject invention.

The subject invention is an electrically warmed baby bottle which is capable of maintaining its contents at a predetermined temperature. The contents of a baby bottle are common knowledge and may include milk, formula, cereal products, water, juice, etc. The container (1) of the subject invention is made of an electrically non-conductive material and is formed in the shape of a conventional baby bottle. Typically, this shape is substantially cylindrical. However, other shapes, such as a bifurcated pinched cylinder, are to be considered within the scope of the subject invention. Any suitable non-conductive material known to one skilled in the art may be used. However, these materials typically include plastic and glass.

In a preferred embodiment of the subject invention a thermometer/thermostat (2)/(22) is present within the container to provide a means for both regulating and visualizing the temperature of the contents.

Figure 1:
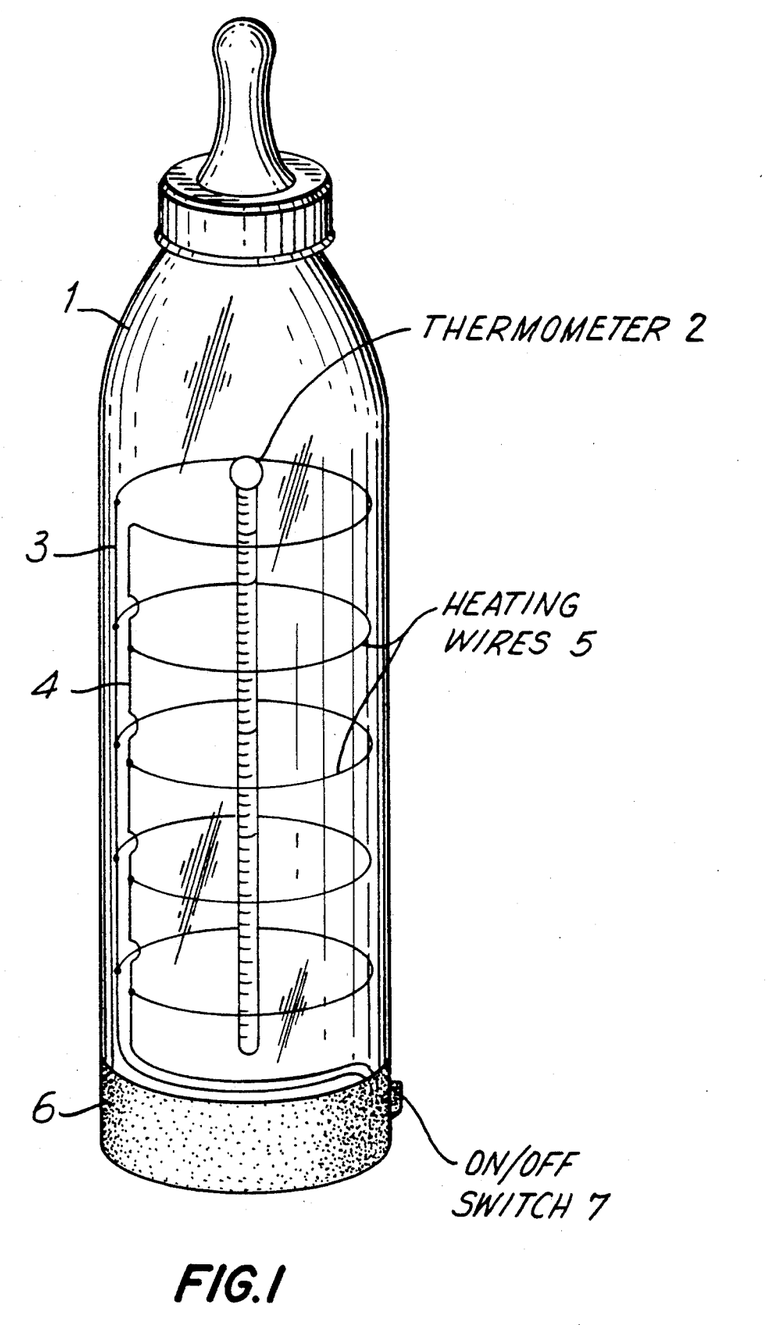
FIG. 1—An overall view of the electrically warmed baby bottle.

The container is heated by a conductive heating wire embedded within the wall of the container. In FIG. 1, the heating wire is shown as a positive wire (3) conducting electricity from the positive terminal of the battery through a series of parallel circumferential heating wires (5) terminating at a negative wire (4) which returns to the negative terminal of the battery (20) thereby completing the circuit. Although this is the preferred embodiment, other conductive type wire heating means may be employed.

Figure 2:
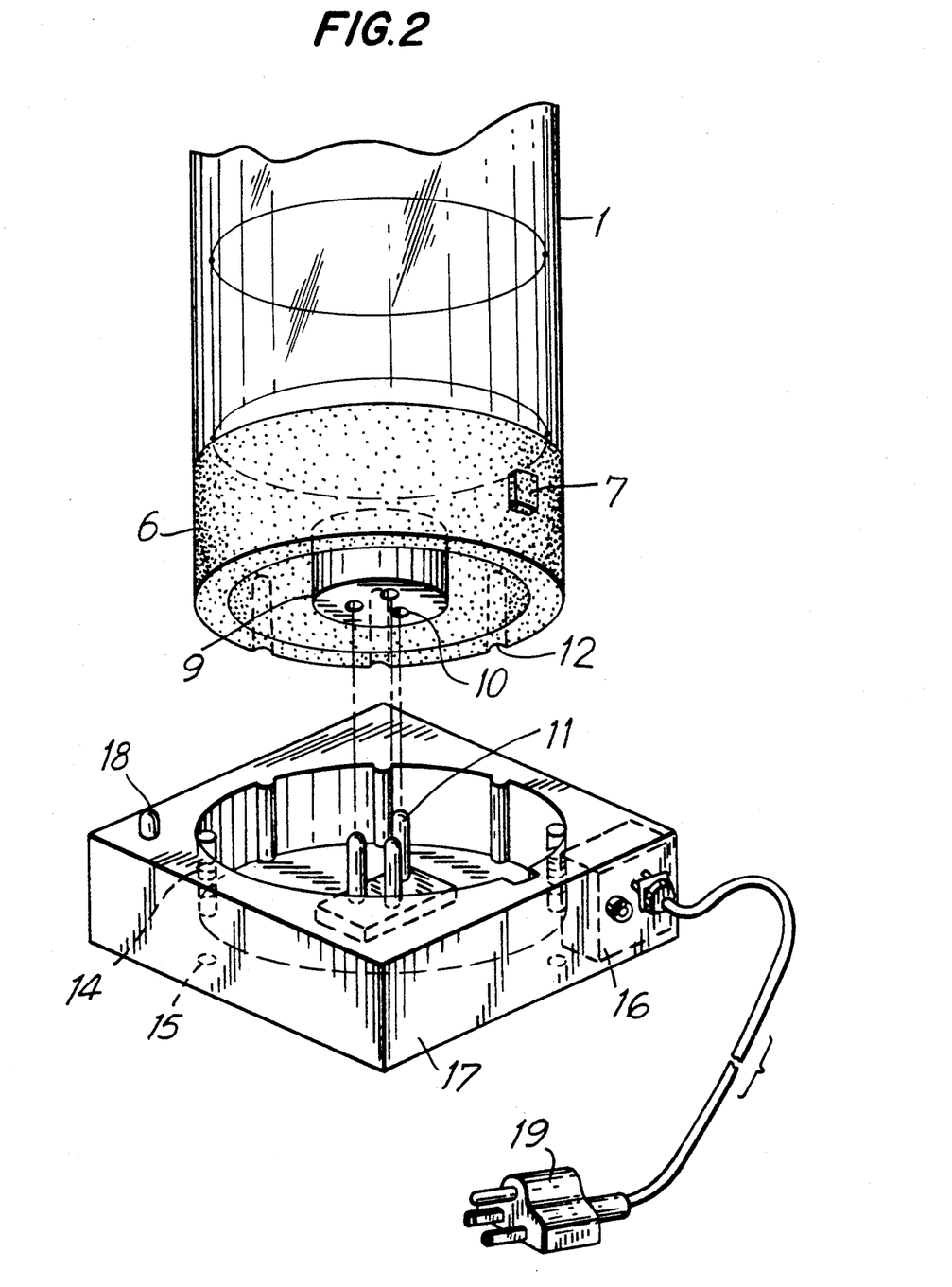
FIG. 2—A detailed perspective view of the electrically warmed baby bottle and battery charger.
Figure 3:
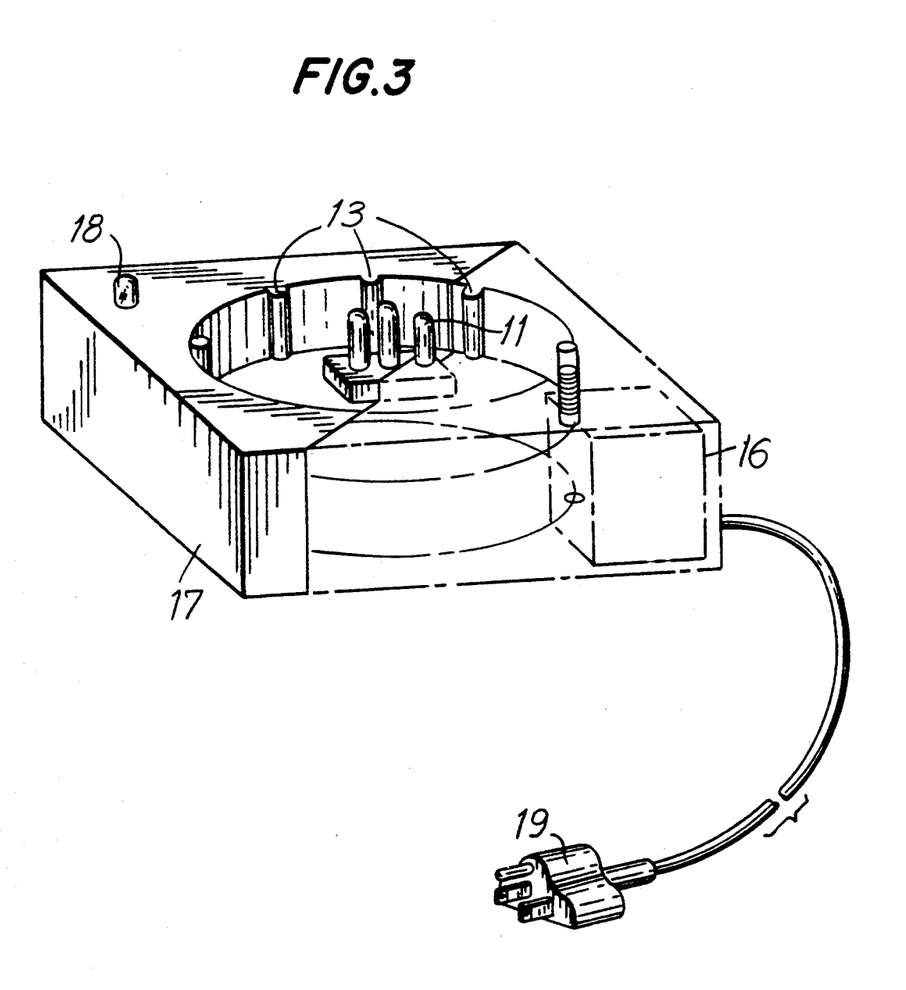
FIG. 3—A detailed view of the battery charger.
Figure 4:
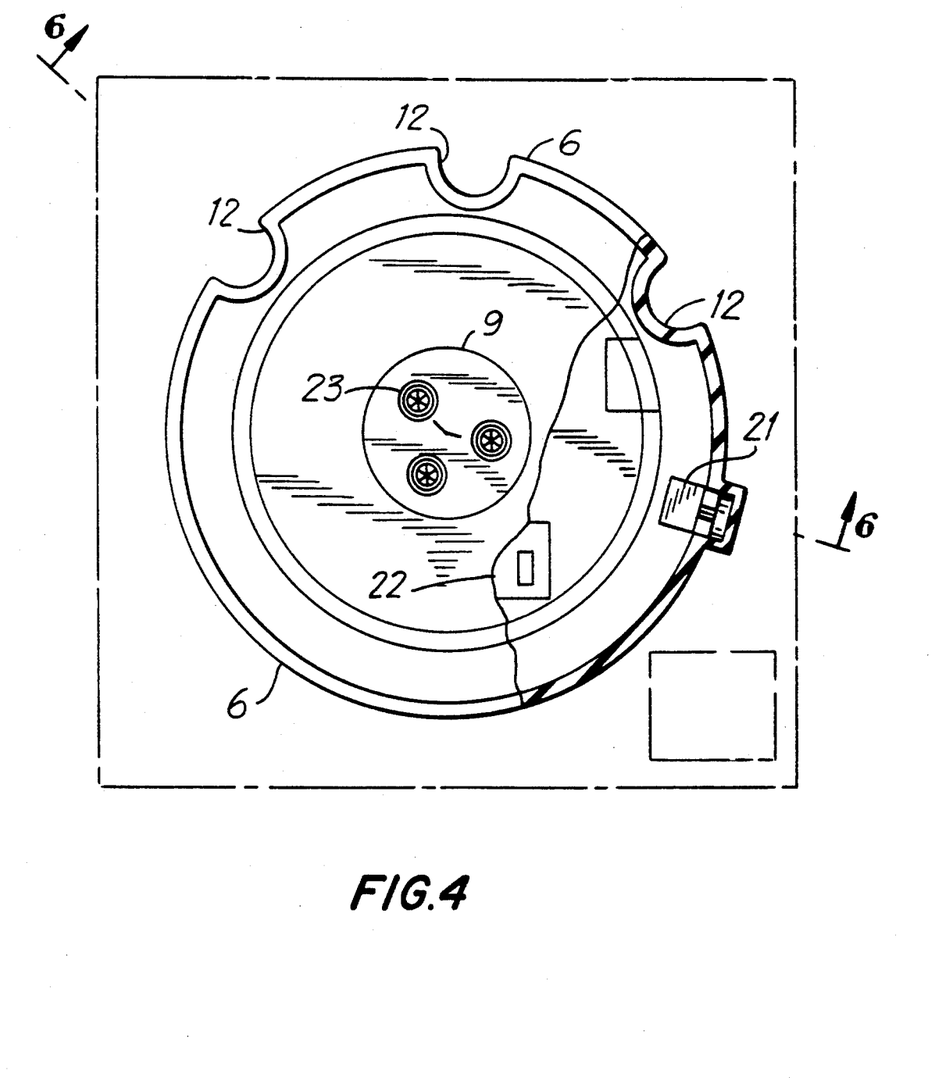
FIG. 4—A bottom plan view of the base of the bottle partially broken away in one section.

A temperature regulation system is mounted below the container (1) in a water-tight housing (6) having self-sealing ports (10) (See FIGS. 2 and 4). The self-sealing ports (10) permit plug prongs of a battery recharger to access and recharge the battery while preventing water from entering the housing. This allows the container (1) and water-tight housing (6) to be washed without causing water damage to the temperature regulation system located within the housing. In addition to the self-sealing ports, the water-tight housing also has a flexible area (7) which allows access of the on-off switch (21). Typically, this flexible area is a rubber accordion boot and the entire water-tight housing is made of rubber or plastic, although this is preferred, not required.

Figure 5A:
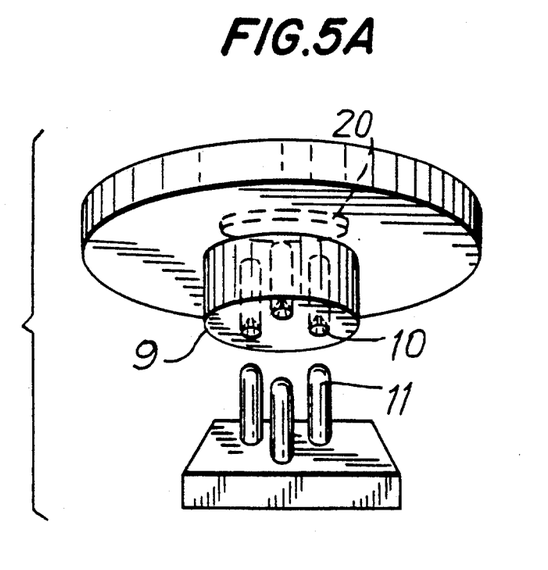
FIG. 5A—A view of the plug prongs of the battery charger and the self-sealing ports of the water-tight housing.
Figure 5B:
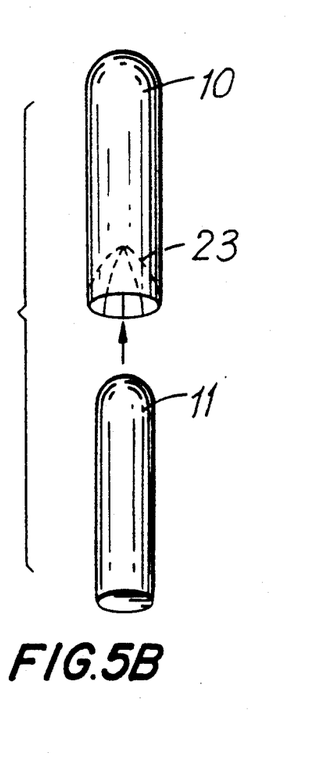
FIG. 5B—An exploded view of a battery charger plug prong and a self-sealing port.
Figure 5C:
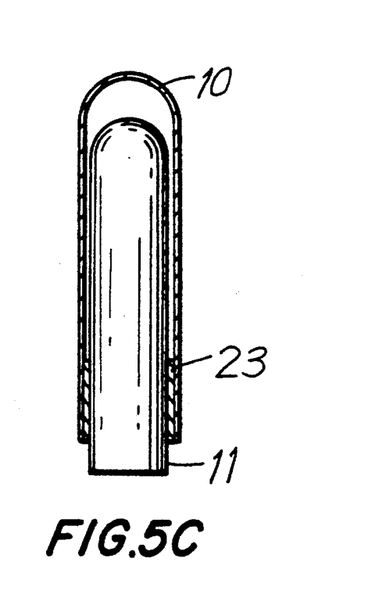
FIG. 5C—An exploded view of the battery charger plug prong within the self-sealing port.
Figure 6:
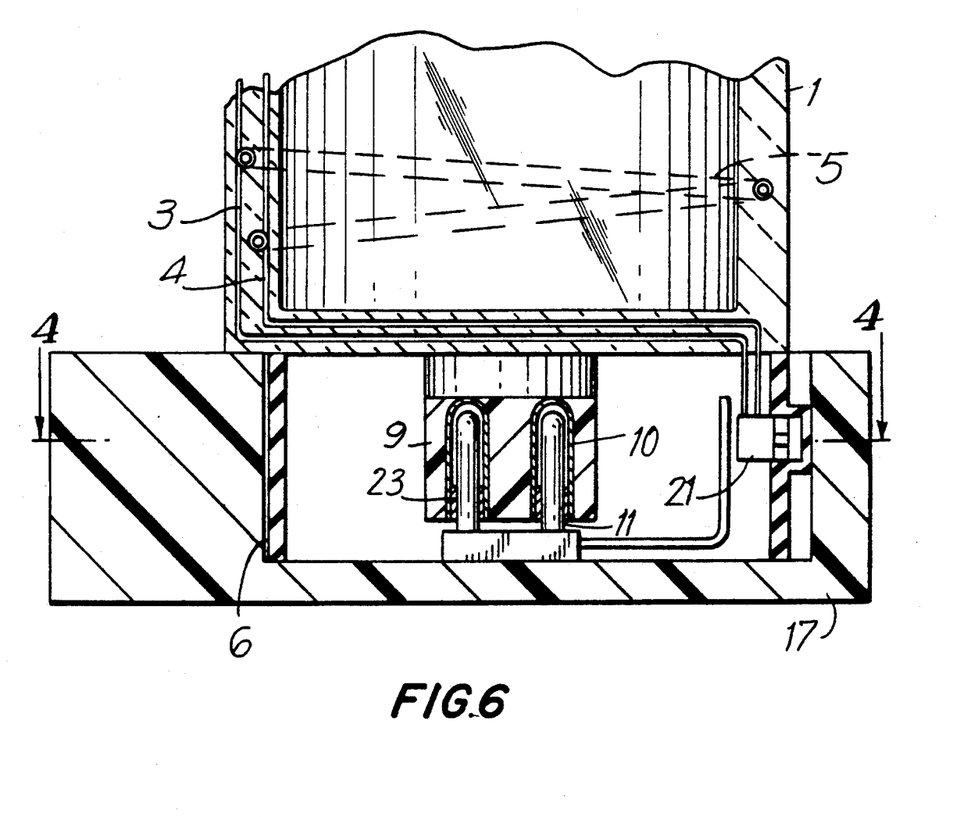
FIG. 6—A cross-sectional view of the battery charger with the bottle inserted taken along line 6—6 shown in FIG. 4.
Figure 7:
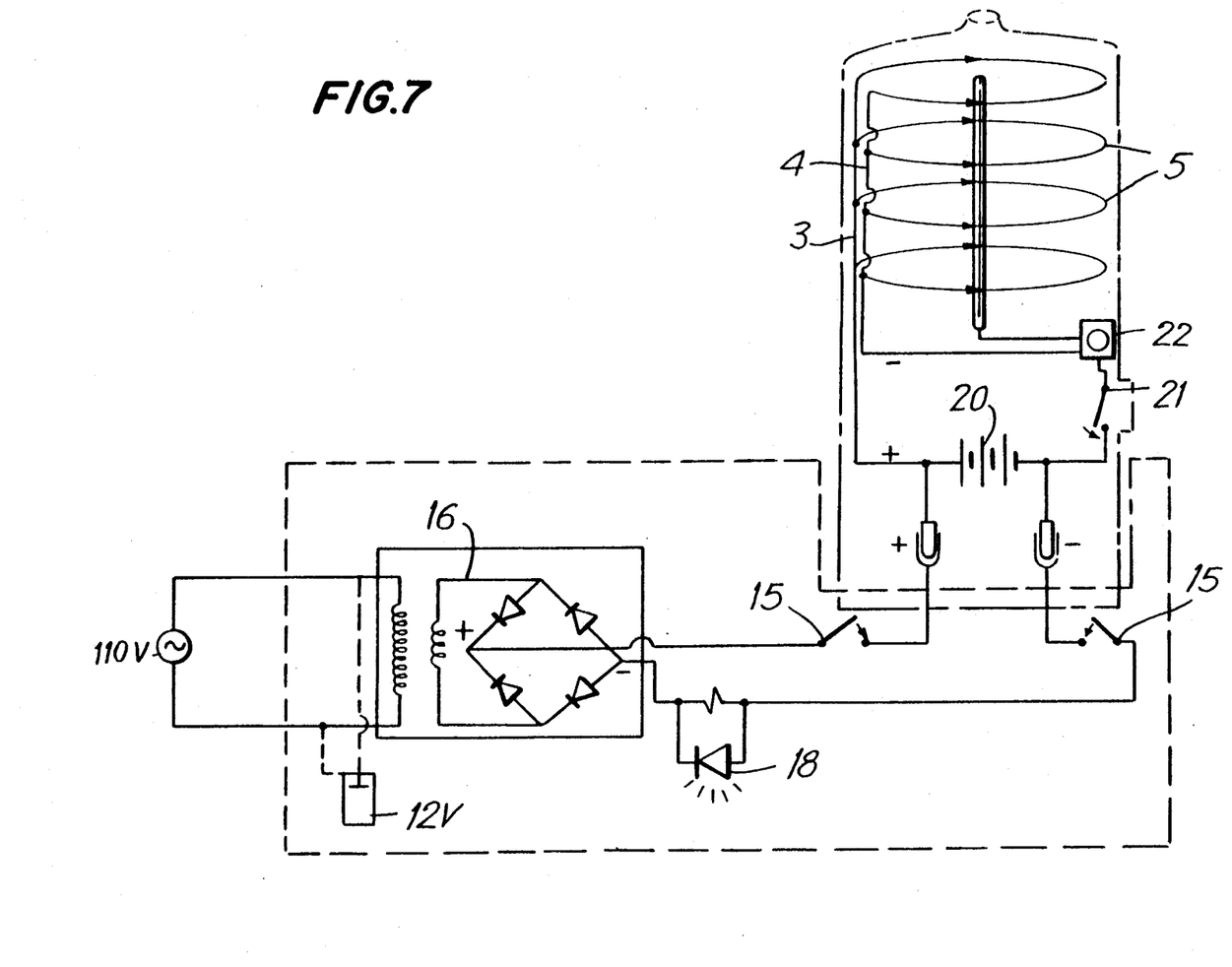
FIG. 7—A schematic diagram showing the interrelationship between the components in the bottle and charger.

In a preferred embodiment, the electrically warmed bottle fits into a battery recharger base unit. As depicted in FIGS. 5A, 5B and 5C, the self-sealing ports (10) align with the plug prongs (11) of a battery charger to aid in coupling the bottle and the battery charger. Note that there are three plug prongs even though only two are required. This preferred embodiment allows for proper alignment of the baby bottle and the battery recharger. In the alternative, two plugs prongs of differing size may be used. To further aid in aligning the bottle and battery charger, it is preferred that the waterproof housing have notches (12) in the side which align with corresponding protrusions (13) on the battery charger.

The battery charger may be designed to have a safety mechanism which severs the flow of current to the plug prongs when the baby bottle is removed. In FIG. 2, the battery charger has two cut-off switches (14) which are depressed when the bottle is inserted. Depression of the switches causes a circuit across the electrocontacts (15) which permits current to flow from the transformer/rectifier (16) to the plug prongs. As depicted in the FIGURES, the cut-off switches (14) typically comprise spring-mounted plungers which are depressed when subjected to the weight of the bottle. In the depressed position, the plungers permit the formation of an electrical circuit; when the bottle is removed, the springs cause the plungers to elevate, thereby breaking the circuit.

The basic mechanism of a battery charger is well known to those skilled in the art. Briefly, electricity enters the charger through a line cord (19) from either a 110V household source (depicted) or through a lower voltage source, such as a 12V automotive battery via the cigarette lighter or the like. The electricity then passes through a transformer/rectifier (16) where it is converted to a voltage/current suitable for recharging a battery. This current then passes through the plug prongs (10) which are inserted into the self-sealing ports (12) of the water-tight housing where they pass through the seal (23) and contact the charging terminals of the battery. In a preferred embodiment, activation of a light (18) will indicate that charging is complete.

The electrically warmed baby bottle and recharging system may be stored within a refrigerator. Further, the battery charger may be adapted to utilize a refrigerator light socket as an energy source. Alternatively, a refrigerator may be manufactured in such a manner so as to power the recharging system. Of particular advantage, is a portable refrigerator which can be powered by either a 110V or a 12V energy source so as to afford maximum versatility to a person charged with the care of an infant.

The claims that follow and their equivalents reflect the scope and spirit of the subject invention and are not to be limited by preferred embodiments described in the preceding text.

What is claimed is:

1. An electrically warmed baby bottle capable of maintaining its contents at a predetermined temperature which comprises:
   (a) a container made of an electrically non-conductive material;
   (b) an electrically conductive heating wire embedded in the wall of the container; and
   (c) a temperature regulation system mounted below the container in a water-tight housing having self-sealing ports, the temperature regulation system being composed of:
      (i) a thermostat which extends through the housing into the interior of the container, the thermostat being able to regulate the flow of electricity to the conductive heating wire so as to maintain the interior of the container at a predetermined temperature;
      (ii) a rechargeable battery connected to the conductive heating wire via the thermostat, the rechargeable battery being mounted in such a manner so as to allow plug prongs of a battery charger to transverse the water-tight housing through the self-sealing ports for recharging the battery; and
      (iii) an on-off switch, the on-off switch being mounted within the water-tight housing and accessible from the exterior of the water-tight housing by indenting a flexible section of the housing.

2. An electrically warmed baby bottle of claim 1, wherein the container is made of plastic.

3. An electrically warmed baby bottle of claim 1, wherein the container is made of glass.

4. An electrically warmed baby bottle of claim 1, wherein electrically conductive heating wire comprises a series of parallel circumferential loops.

5. An electrically warmed baby bottle of claim 1, wherein the electrically warmed baby bottle is washable.

6. An electrically warmed baby bottle of claim 5, wherein the electrically warmed baby bottle is dishwasher safe.

7. An electrically warmed baby bottle of claim 1 further comprising a layer of non-heat conductive material exterior to the heating wire.

8. An electrically warmed baby bottle and recharging system which comprises:
  (1) an electrically warmed baby bottle composed of:
    (a) a container made of an electrically non-conductive material;
    (b) an electrically conductive heating wire embedded in the wall of the container; and
    (c) a temperature regulation system mounted below the container in a water-tight housing having self-sealing ports, the temperature regulation system being composed of:
      (i) a thermostat which extends through the housing into the interior of the container, the thermostat being able to regulate the flow of electricity to the conductive heating wire so as to maintain the interior of the container at a predetermined temperature;
      (ii) a rechargeable battery connected to the conductive heating wire via the thermostat, the rechargeable battery being mounted in such a manner so as to allow plug prongs of a battery charger to transverse the water-tight housing through the self-sealing ports for recharging the battery;
      (iii) an on-off switch, the on-off switch being mounted within the water-tight housing and accessible from the exterior of the water-tight housing by indenting a flexible section of the housing; and
  (2) a battery charger constructed in such a manner so as to conform to the shape of the water-tight housing of the baby bottle, the battery charger having plug prongs which align with the self-sealing ports of the baby bottle so that when the baby bottle is placed in the battery charger, the plug prongs of the battery charger enter the water-tight housing through the self-sealing ports and are in electrical contact with the rechargeable battery.

9. An electrically warmed baby bottle and recharging system of claim 8, wherein the battery charger further comprises a safety mechanism which severs the flow of current to the plug prongs when the baby bottle is removed.

* * * * *